Patented May 1, 1928.

1,668,464

UNITED STATES PATENT OFFICE.

EDWARD LLOYD PEASE, OF DARLINGTON, ENGLAND.

MANUFACTURE OF FERTILIZERS.

No Drawing. Application filed March 11, 1926, Serial No. 94,050, and in Great Britain April 16, 1925.

It is the object of the present invention to produce a fertilizer having a basis of calcium phosphate and containing a relatively high proportion of phosphoric acid. Preferably the phosphate of calcium in the fertilizer is, for the most part, soluble in water or citric acid. For this purpose, the quantity of phosphoric acid added to the calcium phosphate may be such that the product which is to be treated with ammonia may contain free phosphoric acid.

By the present invention, a mineral or organic calcium phosphate is mixed with a porous material, such as peat powder, and the mixture is then treated with phosphoric acid, which may be a crude acid containing some sulphuric acid, calcium sulphate, or other impurities. Owing to the presence of the porous material a dry, porous product may be obtained which is suitable for use as a fertilizer, and is, moreover, readily penetrated by gases. It is thus suitable for treatment with ammonia to increase its fertilizing value. By varying the proportion of the porous material, a wide range of relative proportions of acid to phosphate is available, and the proportion of acid may be sufficient to convert the phosphate for the most part into a form in which it is soluble in citric acid or in water, without yielding a wet or dense mass, unsuitable for use where a dry, powdery fertilizer is required and not in a condition best suited for absorption of ammonia gas, as would be the case if the porous material were absent. Moreover, by suitably increasing the proportion of porous material, the phosphoric acid may be somewhat more dilute than is the practice.

Since a dry porous product may be obtained even when the quantity of phosphoric acid added is considerable, the invention is particularly applicable to the production, by treatment of the product with ammonia, or with gases containing ammonia, of a fertilizer having a high percentage of water-soluble phosphate.

In the preferred form of the invention a porous material, such as peat powder, coarse coke dust, sewage powder or powdered corn cobs, is mixed with a mineral calcium phosphate and the mixture is incorporated with a crude phosphoric acid. When the ground phosphate contains carbonate it is generally profitable to convert this latter into sulphate by addition of sulphuric acid before treatment with phosphoric acid.

The product, when not too acid, is useful as a phosphatic fertilizer but its fertilizing value may be enhanced by treating it with ammonia, such as by using it as an absorbent for ammonia, in which case the free acid is a matter of no particular importance except that it increases the content of ammonia in the final product.

For example, 4 parts by weight of ground rock phosphate are mixed in a mixing machine with 1 part of ground peat and 2½ parts of real $H_3PO_4$ in the form of commercial phosphoric acid are added, mixing being continued until the mass is homogeneous.

The mass is then transferred, for example, to a box in which it forms a layer or layers each of some 6–12 inches deep on a grid and gases containing ammonia, hot or cold, such as coal-gas, coke oven gas or producer gas, which have passed through a condenser or have been treated while hot to remove tarry vapours in known manner, are forced or drawn downwards through the mass. As a precaution against contamination by tar, an uppermost grid may be used carrying a layer of powdered peat to trap any tar not previously removed. When it is found that ammonia is passing freely through the material, the process is at an end.

The result of treating the above mixture with ammonia is a fertilizer which, according to the nature of the rock used and the strength of the acid, contains approximately 67.5 per cent. of phosphate calculated as tricalcium phosphate, this phosphate being present as

|  | Per cent. |
|---|---|
| Water-soluble phosphate | 37.8 |
| Citric acid soluble phosphate | 16.1 |
| Insoluble phosphate | 13.6 |

Also 8 per cent of ammonia and 8.5 per cent of humus in the form of peat. The ratio between the water soluble, citric acid soluble and insoluble phosphate may be varied by the amount of real $H_3PO_4$ in relation to the amount and quality of the phosphate rock, that is to say, by increasing the phosphoric acid and the proportion of insoluble phosphate will be decreased.

It is required of fertilizers for some crops that they should contain a high proportion of ammonia to phosphate, that is a higher proportion than is represented by ammonium phosphate. To secure this result the phosphoric acid used in this invention should contain some sulphuric acid, which may conveniently be secured by using an excess of the latter in making the phosphoric acid.

Having thus described the nature of my said invention and the best means I know of carrying the same into practical effect, I claim:—

1. A method of manufacturing a fertilizer comprising incorporating a porous material with a mineral or organic calcium phosphate, and treating the mixture with phosphoric acid.

2. A method of manufacturing a fertilizer comprising incorporating ground peat with a mineral or organic calcium phosphate and treating the mixture with phosphoric acid.

3. A method of manufacturing a fertilizer comprising incorporating a porous material with a mineral or organic calcium phosphate, treating the mixture with phosphoric acid and then treating the mass with ammonia.

4. A method of manufacturing a fertilizer comprising incorporating ground peat with a mineral or organic calcium phosphate, treating the mixture with phosphoric acid and then treating the mass with ammonia.

5. A method of manufacturing a fertilizer comprising incorporating a porous material with a mineral or organic calcium phosphate, treating the mixture with a mixture of phosphoric acid and sulphuric acid and then treating the mass with ammonia.

6. A method of manufacturing a fertilizer comprising incorporating ground peat with a mineral or organic calcium phosphate, treating the mixture with a mixture of phosphoric acid and sulphuric acid and then treating the mass with ammonia.

In testimony whereof I have signed my name to this specification.

EDWARD LLOYD PEASE. [L. S.]